(12) United States Patent
Schilling

(10) Patent No.: US 7,527,471 B2
(45) Date of Patent: May 5, 2009

(54) STATOR VANE AND GAS TURBINE ENGINE ASSEMBLY INCLUDING SAME

(75) Inventor: Jan Christopher Schilling, Middletown, OH (US)

(73) Assignee: General Electric Company, Schenectady, NY (US)

( * ) Notice: Subject to any disclaimer, the term of this patent is extended or adjusted under 35 U.S.C. 154(b) by 409 days.

(21) Appl. No.: 11/461,023

(22) Filed: Jul. 31, 2006

(65) Prior Publication Data

US 2008/0025839 A1    Jan. 31, 2008

(51) Int. Cl.
*F01D 25/00*    (2006.01)

(52) U.S. Cl. ............... 415/118; 415/191; 29/889.2

(58) Field of Classification Search .......... 415/118, 415/191, 199.5; 356/955; 29/889.2
See application file for complete search history.

(56) References Cited

U.S. PATENT DOCUMENTS

| 3,348,414 | A | * | 10/1967 | Waters et al. ............ 374/115 |
|---|---|---|---|---|
| 4,333,239 | A | | 6/1982 | Arrigoni |
| 4,605,315 | A | * | 8/1986 | Kokoszka et al. ......... 374/144 |
| 4,741,203 | A | | 5/1988 | Willaman et al. |
| 4,765,751 | A | * | 8/1988 | Pannone et al. .......... 374/143 |
| 4,948,264 | A | * | 8/1990 | Hook, Jr. ................. 374/144 |
| 5,345,514 | A | | 9/1994 | Mahdavieh et al. |
| 5,363,463 | A | * | 11/1994 | Kleinerman ............. 385/123 |
| 6,792,809 | B1 | | 9/2004 | Moore |
| 6,943,570 | B2 | | 9/2005 | Duffy et al. |
| 6,992,315 | B2 | | 1/2006 | Twerdochlib |
| 7,075,296 | B2 | | 7/2006 | Moore |
| 2006/0017434 | A1 | | 1/2006 | Tenley et al. |

* cited by examiner

*Primary Examiner*—Ninh H Nguyen
(74) *Attorney, Agent, or Firm*—William Scott Andes, Esq.; Armstrong Teasdale LLP

(57) ABSTRACT

A method for manufacturing a turbine stator vane includes coupling an airfoil to a vane stem wherein the airfoil includes a first sidewall and a second sidewall and wherein the first and second sidewalls are joined at a leading edge and at an axially-spaced trailing edge The method further includes forming an opening at least partially through the vane stem that is sized to receive a light probe therein.

17 Claims, 8 Drawing Sheets

STATOR VANE AND GAS TURBINE ENGINE ASSEMBLY INCLUDING SAME

BACKGROUND OF THE INVENTION

This invention relates generally to gas turbine engines, and more particularly, to a gas turbine engine stator vane that includes an integral light probe for measuring operating characteristics of rotor blades.

Gas turbine engines typically include high and low pressure compressors, a combustor, and at least one turbine. The compressors compress air which is mixed with fuel and channeled to the combustor. The mixture is then ignited for generating hot combustion gases, and the combustion gases are channeled to the turbine which extracts energy from the combustion gases for powering the compressor, as well as producing useful work to propel an aircraft in flight or to power a load, such as an electrical generator.

When gas turbine engines operate in various conditions, foreign objects may be ingested into the engine. More specifically, various types of foreign objects may be entrained in the inlet of the gas turbine engine, ranging from large birds, such as sea gulls, to hailstones, sand, and rain. The foreign objects may impact a rotor blade resulting in a portion being liberated from the rotor blade. Such a condition, known as foreign object damage, may cause relatively sharp notches to be formed in the leading edges of the rotor blade. These sharp notches in effect are stress concentrations which may reduce the fatigue capability of the rotor blade. If this condition is not resolved, a portion of the airfoil, usually the tip, may be liberated, thus changing the frequency of the airfoil. When this occurs there will be a flow disturbance around the blade with the missing tip or tip corner. This disturbance can cause a driving force which will drive adjacent airfoils to possible failure.

To measure a frequency change in the rotor blade, a strain gage may be utilized. However, strain gages may not have the desired precision to measure a relatively small change in the rotor blade frequency. Additionally, a light probe may be utilized to measure the change in rotor blade frequency. More specifically, at least one known gas turbine engine includes a threaded opening that is defined through the gas turbine engine casing. The known light probe is inserted through the casing opening to illuminate the rotor blade. However, during operation, the rotor blade tends to centrifuge dirt and/or debris radially outward towards the light probe. As a result, the dirt or debris may accumulate on the light probe thereby lowering the effectiveness of the light probe to accurately measure the frequency of the rotor blades.

BRIEF DESCRIPTION OF THE INVENTION

In one aspect, a method for manufacturing a stator vane is provided. The method includes coupling an airfoil to a vane stem, the airfoil including a first sidewall and a second sidewall, the first and second sidewalls joined at a leading edge and at an axially-spaced trailing edge, and forming an opening at least partially through the vane stem, the opening sized to receive a light probe therein.

In another aspect, a stator vane is provided. The stator vane includes a vane stem, an airfoil coupled to the vane stem, the airfoil including a first sidewall and a second sidewall, the first and second sidewalls joined at a leading edge and at an axially-spaced trailing edge, and a probe inspection port including an opening extending at least partially through the vane stem, the opening sized to receive a light probe therein.

In a further aspect, a gas turbine engine assembly is provided. The gas turbine engine assembly includes a compressor, a combustor, and a turbine coupled to the compressor. The compressor includes a rotor assembly including a plurality of rotor stages, each rotor stage including a plurality of rotor blades, and a stator vane assembly including a plurality of stator vanes stages, each stator vane stage including a plurality of stator vanes, at least one of the stator vane stages coupled upstream from at least one of the rotor stages, at least one of the stator vanes. At least one of the stator vanes includes a vane stem, an airfoil coupled to the vane stem, the airfoil including a first sidewall and a second sidewall, the first and second sidewalls joined at a leading edge and at an axially-spaced trailing edge, and a probe inspection port including an opening extending at least partially through the vane stem, the opening sized to receive a light probe therein.

DETAILED DESCRIPTION OF THE INVENTION

Figure 1:
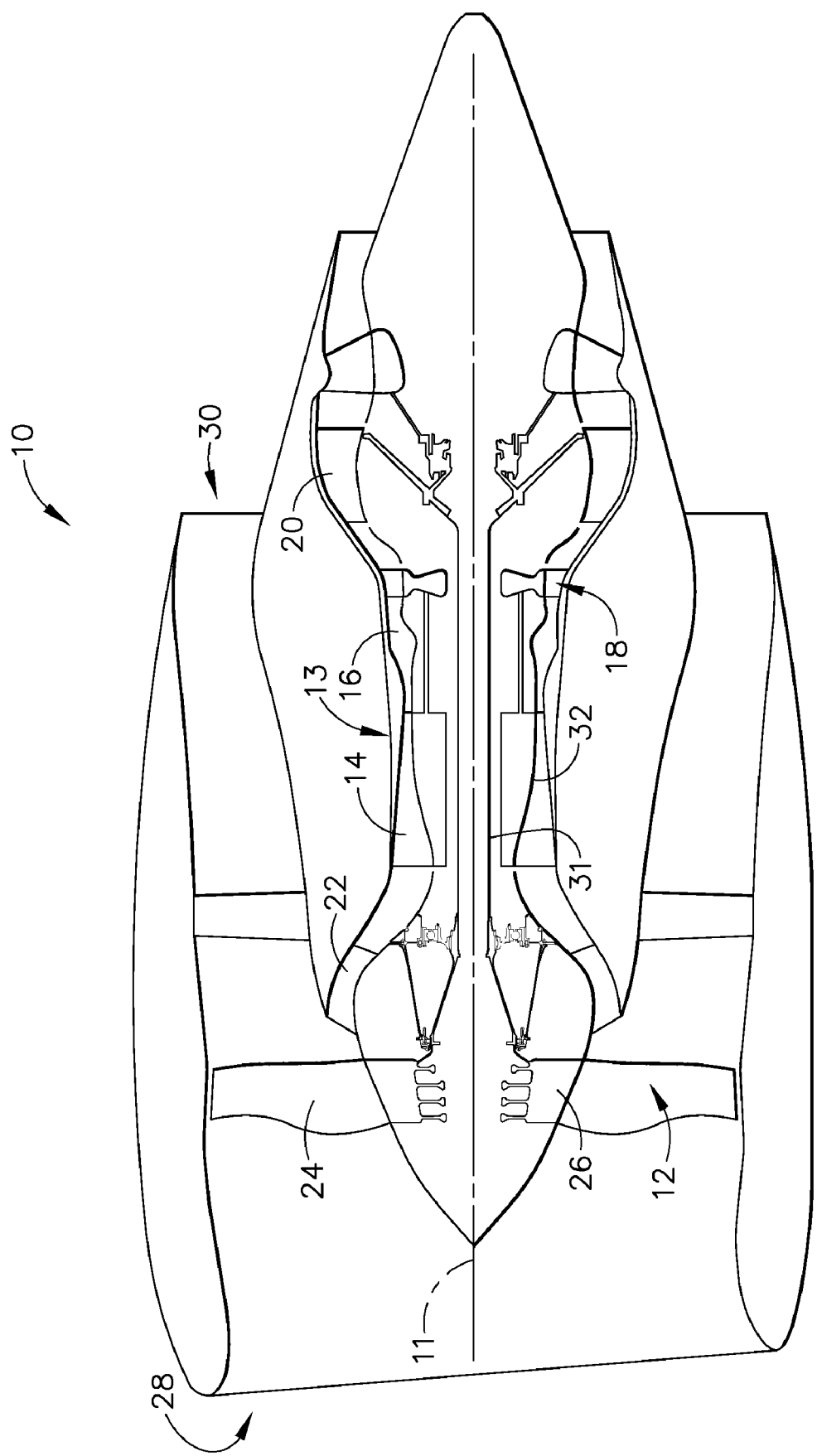
FIG. 1 is a cross-sectional view of an exemplary gas turbine engine.

FIG. 1 is a schematic illustration of an exemplary gas turbine engine assembly 10 having a longitudinal axis 11. Gas turbine engine assembly 10 includes a fan assembly 12, and a core gas turbine engine 13 that includes a high pressure compressor 14, a combustor 16, and a high pressure turbine 18. In the exemplary embodiment, gas turbine engine assembly 10 also includes a low pressure turbine 20 and a multi-stage booster compressor 22.

Fan assembly 12 includes an array of fan blades 24 extending radially outward from a rotor disk 26. Engine 10 has an intake side 28 and an exhaust side 30. In the exemplary embodiment, gas turbine engine 10 is a GE90 gas turbine engine that is available from General Electric Company, Cincinnati, Ohio. Fan assembly 12, booster 22, and low-pressure turbine 20 are coupled together by a first rotor shaft 31, and compressor 14 and high-pressure turbine 18 are coupled together by a second rotor shaft 32.

In operation, air flows through fan assembly 12 and compressed air is supplied to high pressure compressor 14 through booster 22. The booster discharge air is channeled to compressor 14 wherein the airflow is further compressed and delivered to combustor 16. Hot products of combustion (not shown in FIG. 1) from combustor 16 are utilized to drive turbines 18 and 20, and turbine 20 is utilized to drive fan assembly 12 and booster 22 by way of shaft 31. Engine 10 is operable at a range of operating conditions between design operating conditions and off-design operating conditions.

Figure 2:
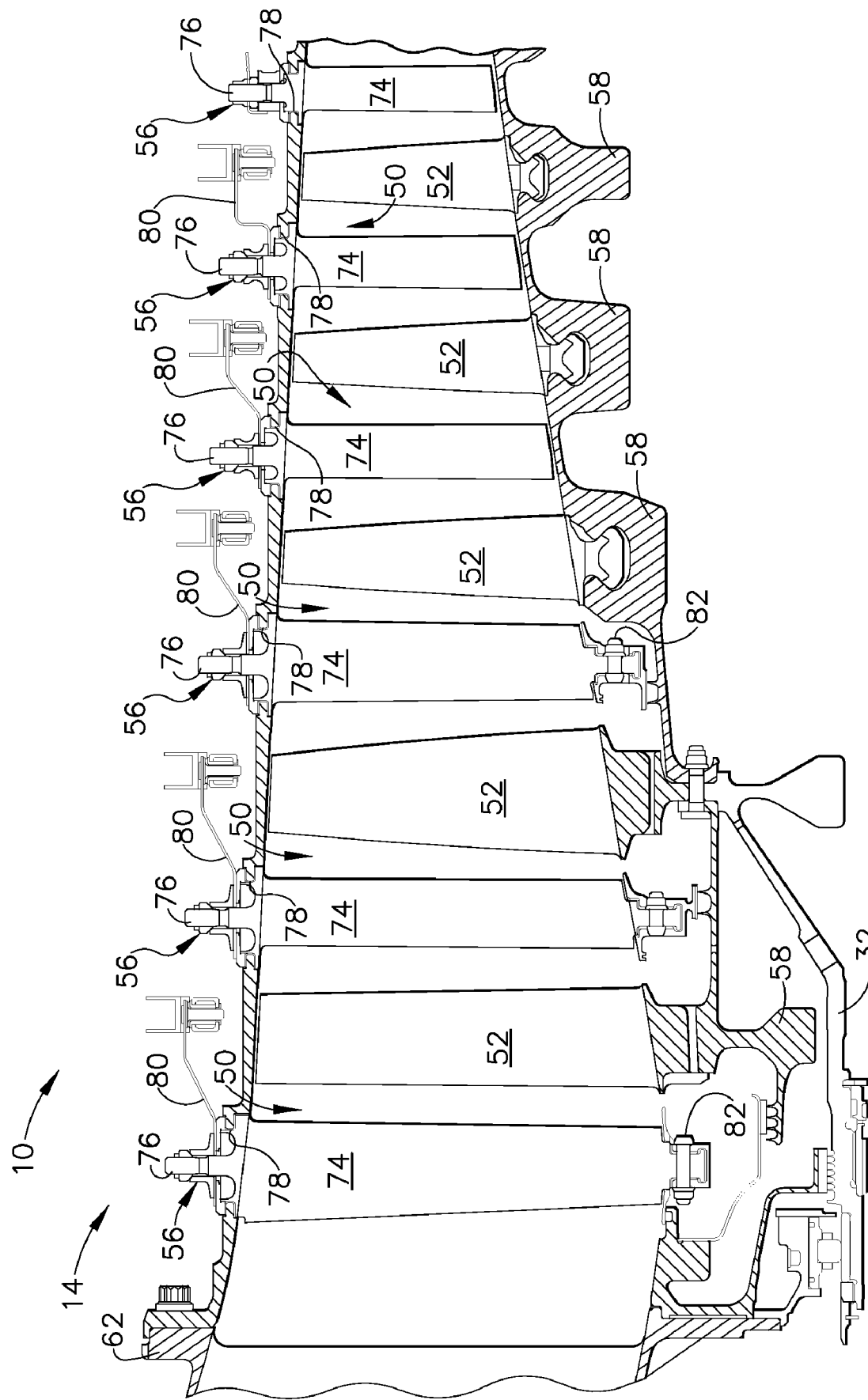
FIG. 2 is a cross-sectional view of a section of an exemplary high pressure compressor used with the gas turbine engine shown in FIG. 1.

FIG. 2 is a schematic view of a section of high pressure compressor 14. Compressor 14 includes a plurality of stages 50 wherein each stage 50 includes a row of rotor blades 52 and a row of variable stator vane assemblies 56. Rotor blades 52 are typically supported by rotor disks 58, and are connected to rotor shaft 32. Rotor shaft 32 is a high pressure shaft that is also connected to high pressure turbine 18 (shown in FIG. 1). Compressor 14 is surrounded by a casing 62 that supports variable stator vane assemblies 56.

Each variable stator vane assembly 56 includes a variable vane 74 and a vane stem 76. Vane stem 76 protrudes through an opening 78 in casing 62. Each variable vane assembly 56 also includes a lever arm 80 extending from variable vane 74 that is utilized to rotate variable vanes 74. Vanes 74 are oriented relative to a flow path through compressor 14 to control air flow therethrough. In addition, at least some vanes 74 are attached to an inner shroud 82. Although, FIG. 2 illustrates compressor 14 including a plurality of variable stator vanes 74, it should be realized that compressor 14 may include a plurality of fixed stator vanes utilized in lieu of variable stator vanes 74.

Figure 3:
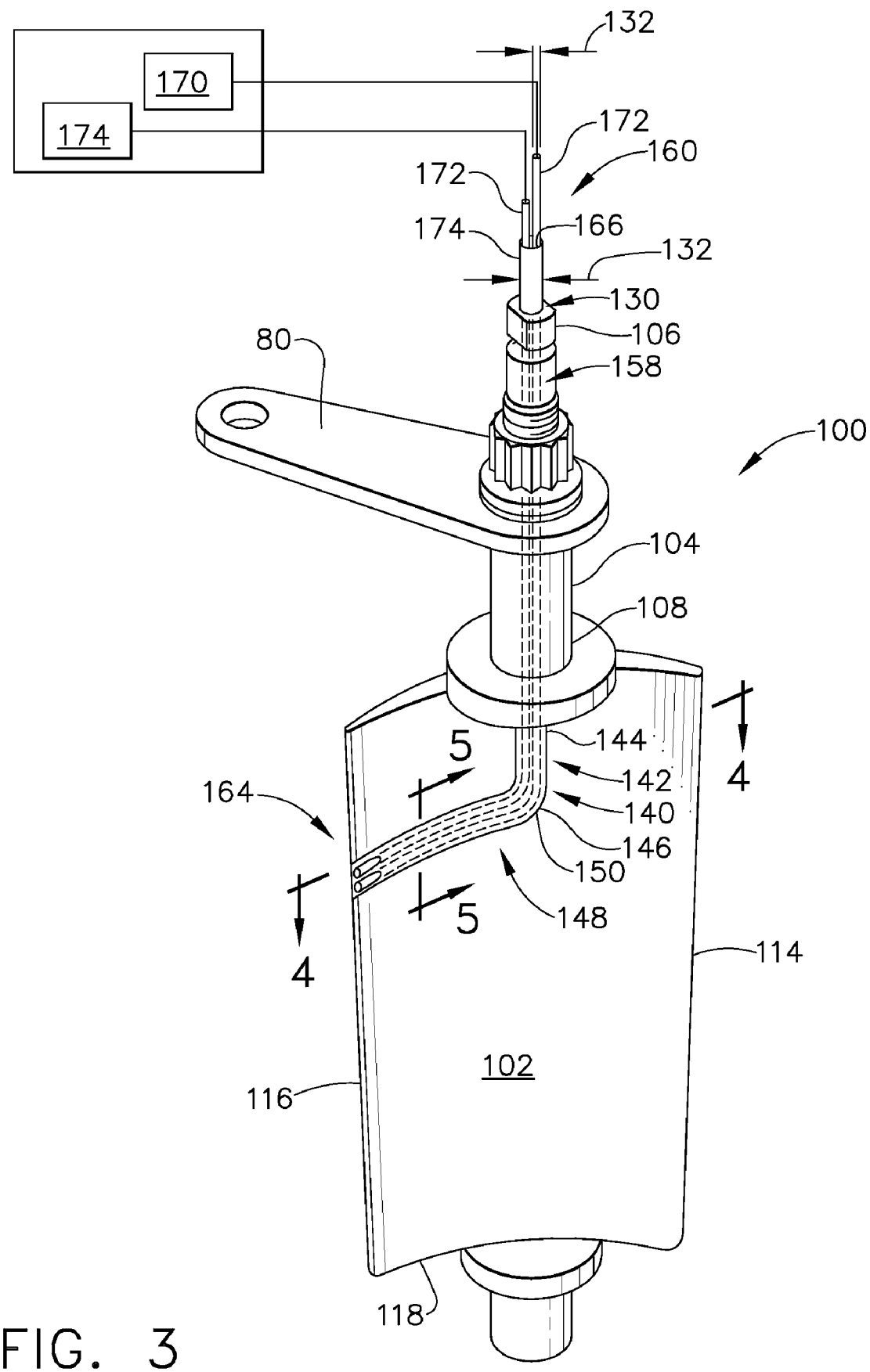
FIG. 3 is a perspective view of an exemplary stator vane including a light probe that may be utilized with the gas turbine engine shown in FIG. 1.
Figure 4:
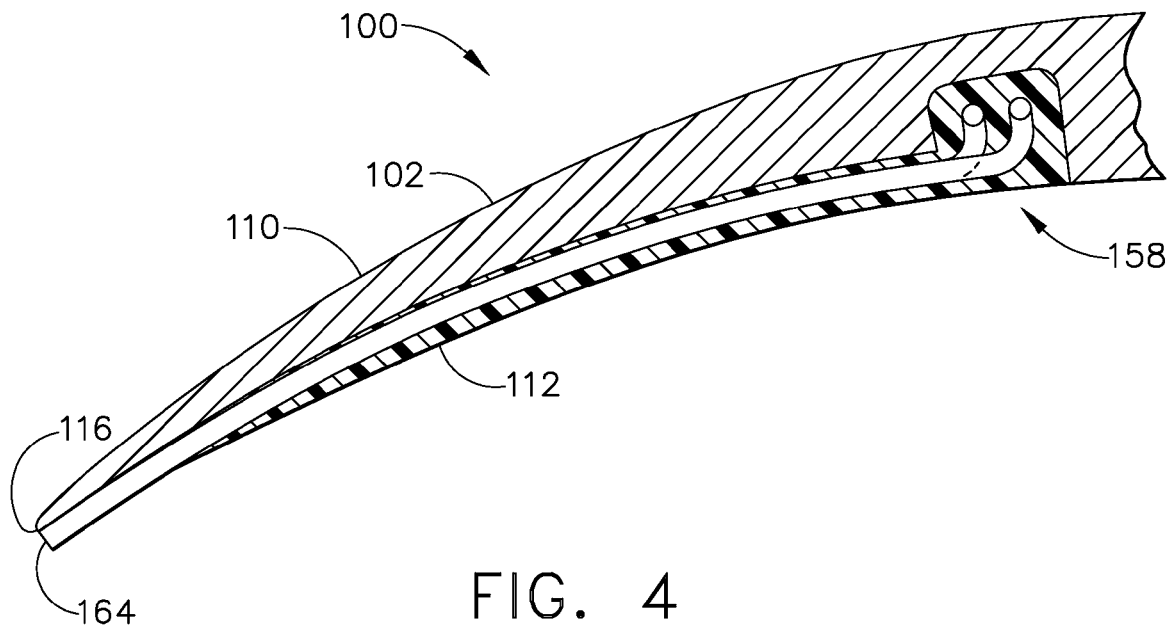
FIG. 4 is a top sectional view of a portion of the stator vane shown in FIG. 3 taken through section 4-4.
Figure 5:
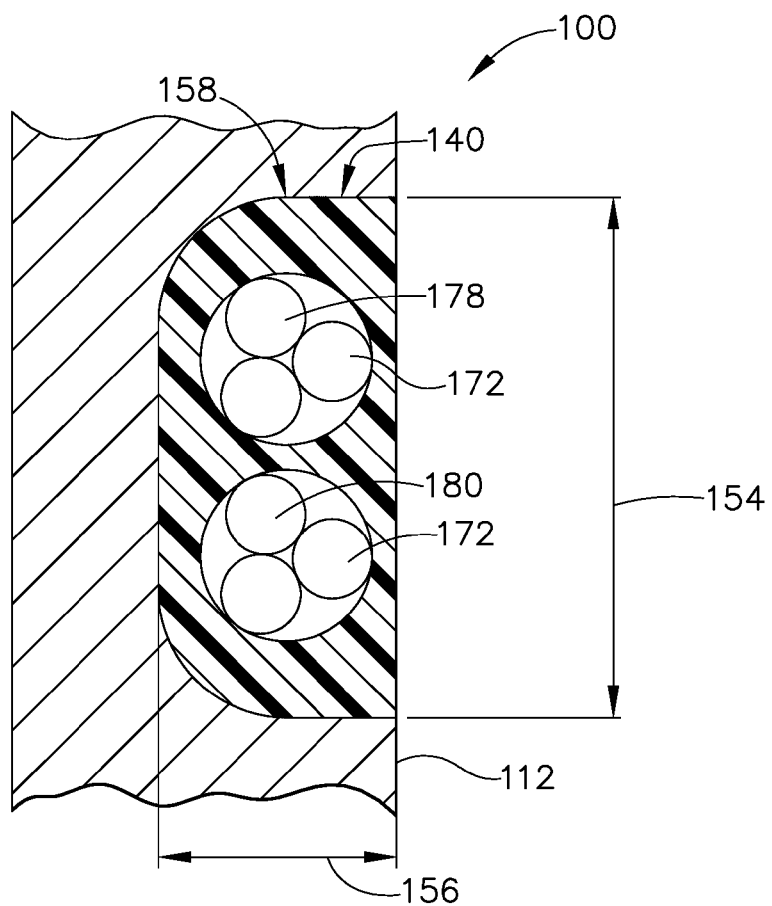
FIG. 5 is a section view of the stator vane shown in FIG. 3 taken through section 5-5.

FIG. 3 is a perspective view of an exemplary stator vane 100 that may be utilized with compressor 14 shown in FIGS. 1 and 2 in either a fixed or variable configuration. FIG. 4 is a top sectional view of the stator vane shown in FIG. 3 taken through section 4-4. FIG. 5 is a section view of the stator vane shown in FIG. 3 taken through section 5-5. Stator vane 100 includes an airfoil 102 and an integral vane stem 104 that is used for mounting stator vane 100 within gas turbine engine 10. More specifically, vane stem 104 includes a first or radially outer end 106 that in the exemplary embodiment is coupled to lever arm 80, and a second or radially inner root 108 that is coupled to airfoil 102. In the exemplary embodiment, airfoil 102 is formed unitarily with vane stem 104 to form a unitary stator vane 100.

Each airfoil 102 includes a first sidewall 110 and a second sidewall 112. In one embodiment, either first and/or second sidewalls 110 and/or 112 may be contoured to improve aerodynamic performance. In the exemplary embodiment, first sidewall 110 is convex and defines a suction side of airfoil 102, and second sidewall 112 is concave and defines a pressure side of airfoil 102. Sidewalls 110 and 112 are joined at a leading edge 114 and at an axially-spaced trailing edge 116 of airfoil 102. More specifically, airfoil trailing edge 116 is spaced chordwise and downstream from airfoil leading edge 114. First and second sidewalls 110 and 112, respectively, extend longitudinally or radially outward in span from an airfoil root 118 to vane stem 104. As shown in FIG. 2, in some embodiments, stator vane 100 may be coupled to inner shroud 82. In the exemplary embodiment, each stator vane 100 is fabricated utilizing a metallic material such as, but not limited to, titanium. In an alternative embodiment, each stator vane 100 is fabricated utilizing a composite material.

As shown in FIG. 3, stator vane 100 includes an opening 130 that extends from vane stem radially outer end 106, substantially concentrically through vane stem 104, to vane stem radially inner root 108. In the exemplary embodiment, opening 130 has a diameter 132 that is sized to receive a light probe that will be discussed later herein. Additionally, airfoil 102 includes a groove or slot 140 that is machined into a surface of airfoil 102. In the exemplary embodiment, groove 140 is machined into second sidewall 112, i.e. the concave side of airfoil 102. Optionally, groove 140 is machined into first sidewall 110, i.e. the convex side or airfoil 102. Groove 140 includes a first groove portion 142 having a first end 144 that is substantially concentrically aligned with opening 130 and a second end 146. First groove portion 142 extends radially inwardly at least partially towards airfoil root 118.

Groove 140 also includes a second groove portion 148 that extends axially downstream from first groove portion second end 146 towards airfoil trailing edge 116. Second groove portion 148 has a first end 150 that is substantially aligned with first groove portion second end 146 and a second groove portion second end 152 that is positioned proximate to airfoil trailing edge 116. As such, and as shown in FIG. 3, groove 140 has a substantially L-shaped profile and extends continuously from vane stem 104 to airfoil trailing edge 116. Groove 140 has a width 154 and a depth 156 that are sized to receive the light probe discussed below.

Accordingly, the combination of opening 130 and groove 140 form a continuous probe inspection port 158 that extends from the vane stem radially outer end 106, through vane stem 104, radially inwardly towards airfoil root 118, and axially downstream towards airfoil trailing edge 116.

Gas turbine engine assembly 10 also includes an instrumentation light probe 160 that includes a first end 164 and a second end 166. In the exemplary embodiment, light probe 160 may be fabricated utilizing a plurality of fibers 172 that are encased within a stainless steel sheath 174, for example. Optionally, the optical fibers are encased within a non-metallic sheath. As shown in FIG. 3, at least a portion of light probe 160 is positioned at least partially within inspection port 158 to facilitate securing light probe 160 to stator vane 100. More specifically, during assembly, light probe first end 164 is inserted into vane stem radially outer end 106, fed through vane stem 104, and positioned within groove 140. For example, light probe 160 may be configured, by bending for example, such that light probe 160 has a profile that is substantially similar to the profile of groove 140. The light probe 160 is then positioned within groove 140 such that light probe first end 164 is positioned proximate to airfoil trailing edge 116.

Light probe 160 is then coupled to stator vane 100 such that the light probe 160 emits light downstream from the airfoil trailing edge 116 toward at least one rotor blade, such as compressor rotor blades 52, for example. In the exemplary embodiment, an epoxy material or other adhesive is utilized to facilitate securing light probe 160 in a substantially fixed position within groove 140. Optionally, groove 140 is selectively sized to receive light probe 160 in a friction fit such that an epoxy is not utilized to secure light probe 160 within groove 140.

As such, light probe 160 is configured to remain substantially permanently with gas turbine engine assembly, such that light probe 160 may be utilized during engine operation, or utilized during an engine maintenance period. For example, to utilize light probe 160, a light source 170 and a photodetector 176, camera, or the like, are coupled to light probe second end 166. The light source 170 supplies light through at least one optical fiber 172 to the probe operating end, i.e. light probe first end 164.

In use, light source 170 is activated such that light is transmitted through light probe 160 to illuminate at least one rotor blade 52. The light reflected from rotor blade 52 is received through at least one optical fiber 172 and transmitted through at least one fiber 178 to light probe second end 166 wherein the light signals are reflected by the rotor blades back to at least one optical fiber 180 which then transmits the light signal back to photodetector 176, for example. The received light signals may then be used to measure operating characteristics of the blades 52, such as blade vibration, axial displacement of the blades, changes in the blade contour, and/or untwist of the blade, caused by centrifugal forces.

Figure 6:
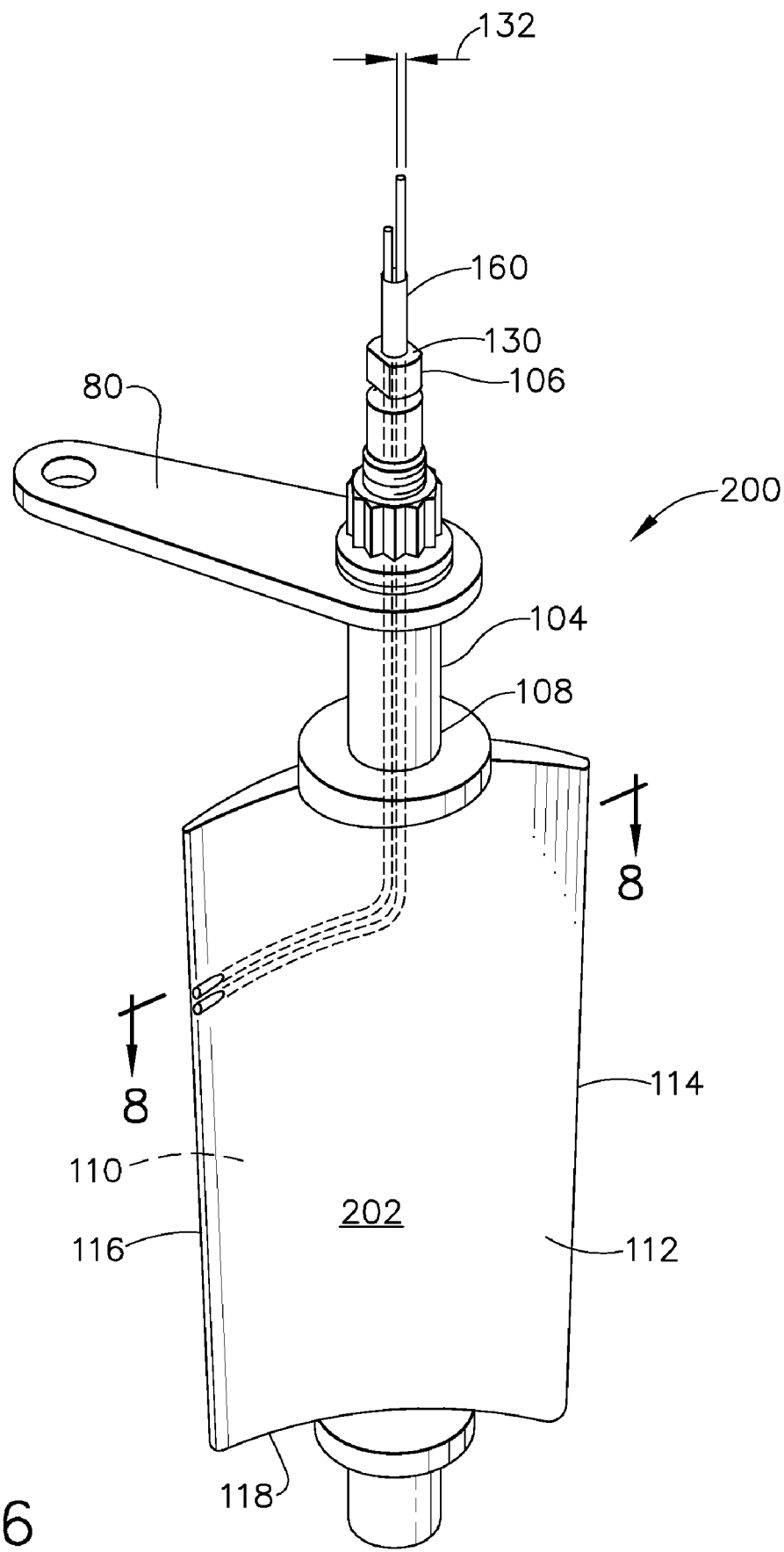
FIG. 6 is a perspective view of another exemplary stator vane including a light probe that may be utilized with the gas turbine engine shown in FIG. 1.
Figure 7:
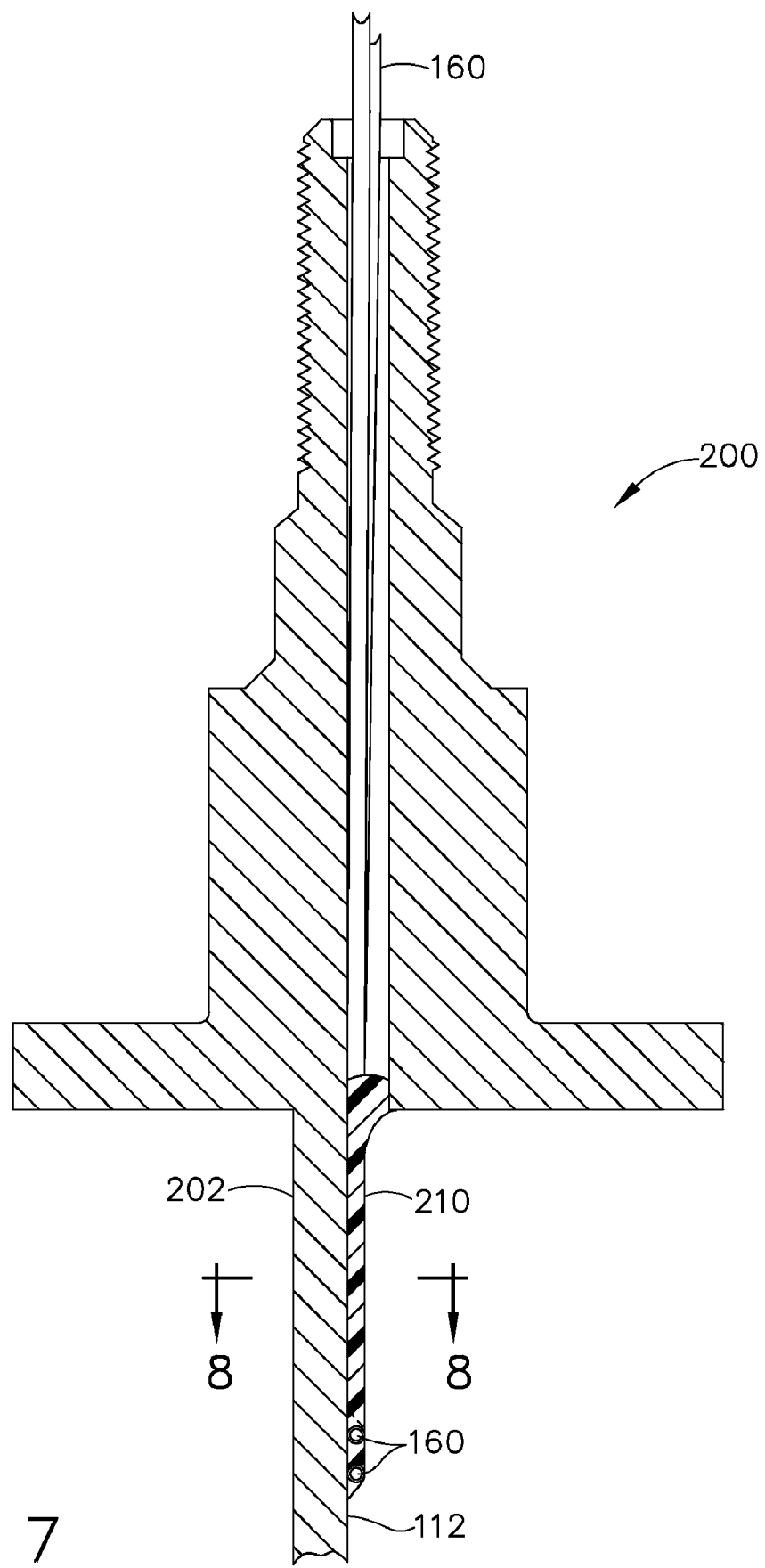
FIG. 7 is a side cutaway view of the stator vane shown in FIG. 6.
Figure 8:
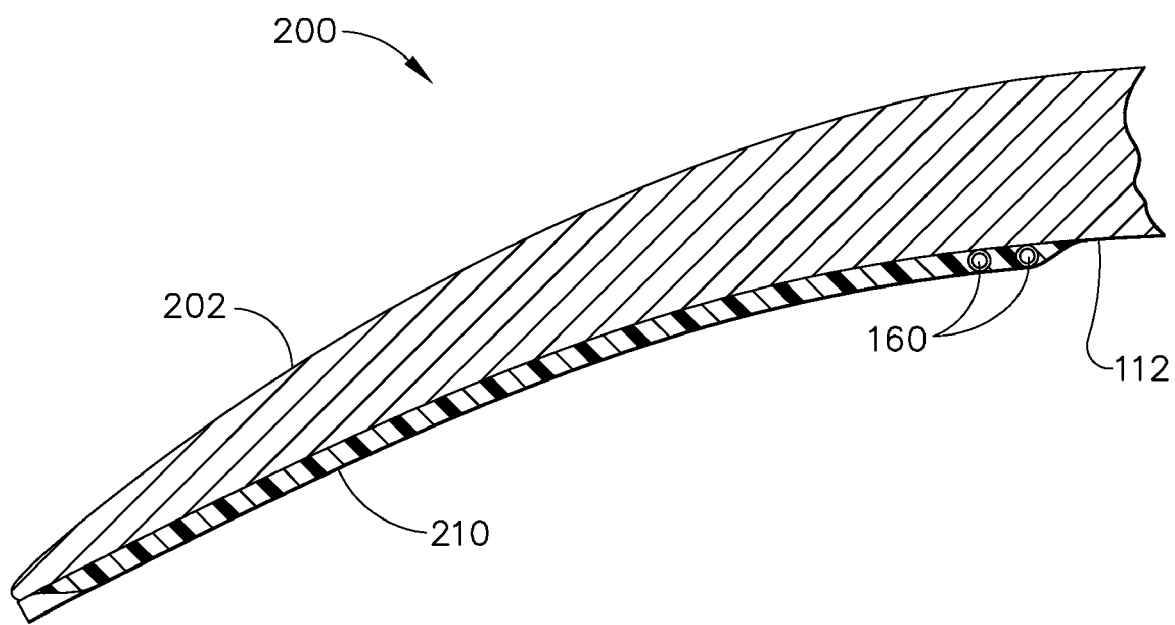
FIG. 8 is a top section view of the stator vane shown in FIG. 6 taken through section 8-8.

FIG. 6 is a perspective view of an exemplary stator vane 200 including light probe 160 that may be utilized with the gas turbine engine shown in FIG. 1. FIG. 7 is a side cutaway view of the stator vane shown in FIG. 6. FIG. 8 is a top section view of the stator vane shown in FIG. 6 taken through section 8-8. Stator vane 200 includes an airfoil 202 and an integral vane stem 104 that is used for mounting stator vane 200 within gas turbine engine 10. More specifically, vane stem 104 includes a first or radially outer end 106 that in the exemplary embodiment is coupled to lever arm 80 shown in FIG. 2, and a second or radially inner root 108 that is coupled to airfoil 202. As discussed above, in the exemplary embodiment, airfoil 202 is formed unitarily with vane stem 104 to form a unitary stator vane 100.

Each airfoil 202 includes first sidewall 110 and second sidewall 112. In one embodiment, either first and/or second sidewalls 110 and/or 112 may be contoured to improve aerodynamic performance. In the exemplary embodiment, first sidewall 110 is convex and defines a suction side of airfoil 202, and second sidewall 112 is concave and defines a pressure side of airfoil 202. Sidewalls 110 and 112 are joined at a leading edge 114 and at an axially-spaced trailing edge 116 of airfoil 202. More specifically, airfoil trailing edge 116 is spaced chordwise and downstream from airfoil leading edge 114. First and second sidewalls 110 and 112, respectively, extend longitudinally or radially outward in span from an airfoil root 118 to vane stem 104. As shown in FIG. 2, in some embodiments, stator vane 200 may be coupled to inner shroud 82. In the exemplary embodiment, each stator vane 200 is fabricated utilizing a metallic material such as, but not limited to, titanium. In an alternative embodiment, each stator vane 200 is fabricated utilizing a composite material.

As shown in FIG. 6, stator vane 200 includes an opening 130 that extends from vane stem radially outer end 106, through vane stem 104, to vane stem radially inner root 108. In the exemplary embodiment, opening 130 has a diameter 132 that is sized to receive light probe 160.

In this exemplary embodiment, stator vane 200 does not include a groove or slot 140 that is machined into a surface of airfoil 202. Rather, light probe 160 is coupled to a surface of airfoil 202. For example, in one embodiment, light probe 160 is coupled to second sidewall 112, i.e. the concave side of airfoil 202. Optionally, light probe 160 may be coupled to first sidewall 110, i.e. the convex side or airfoil 202.

More specifically, and as shown in FIGS. 6 and 7, to fabricate stator vane 200, additional material 210 is bonded to an exterior surface of airfoil 202 to secure light probe 160 to airfoil 202. Specifically, light probe 160 is positioned along the exterior surface of airfoil 202. Additional material 210 is then applied to airfoil 202 to facilitate securing light probe 160 to airfoil 202. The additional material 210 is then machined or feathered such that an aerodynamic profile of airfoil 202 is optimized. Specifically, airfoil 202 is machined to facilitate forming a relatively smooth airflow path over and/or around light probe 160 and therefore reduce and/or eliminate any airflow disruptions that may occur as a result of mounting light probe 160 to an exterior surface of airfoil 202. As such, light probe 160 may be coupled to any known airfoils by simply adhering the light probe 160 to airfoil 202 utilizing additional material 210. In the exemplary embodiment, the additional material 210 may be either a metallic material similar to the metallic material utilized to fabricate airfoil 202, a composite material, and/or a resin product.

Figure 9:
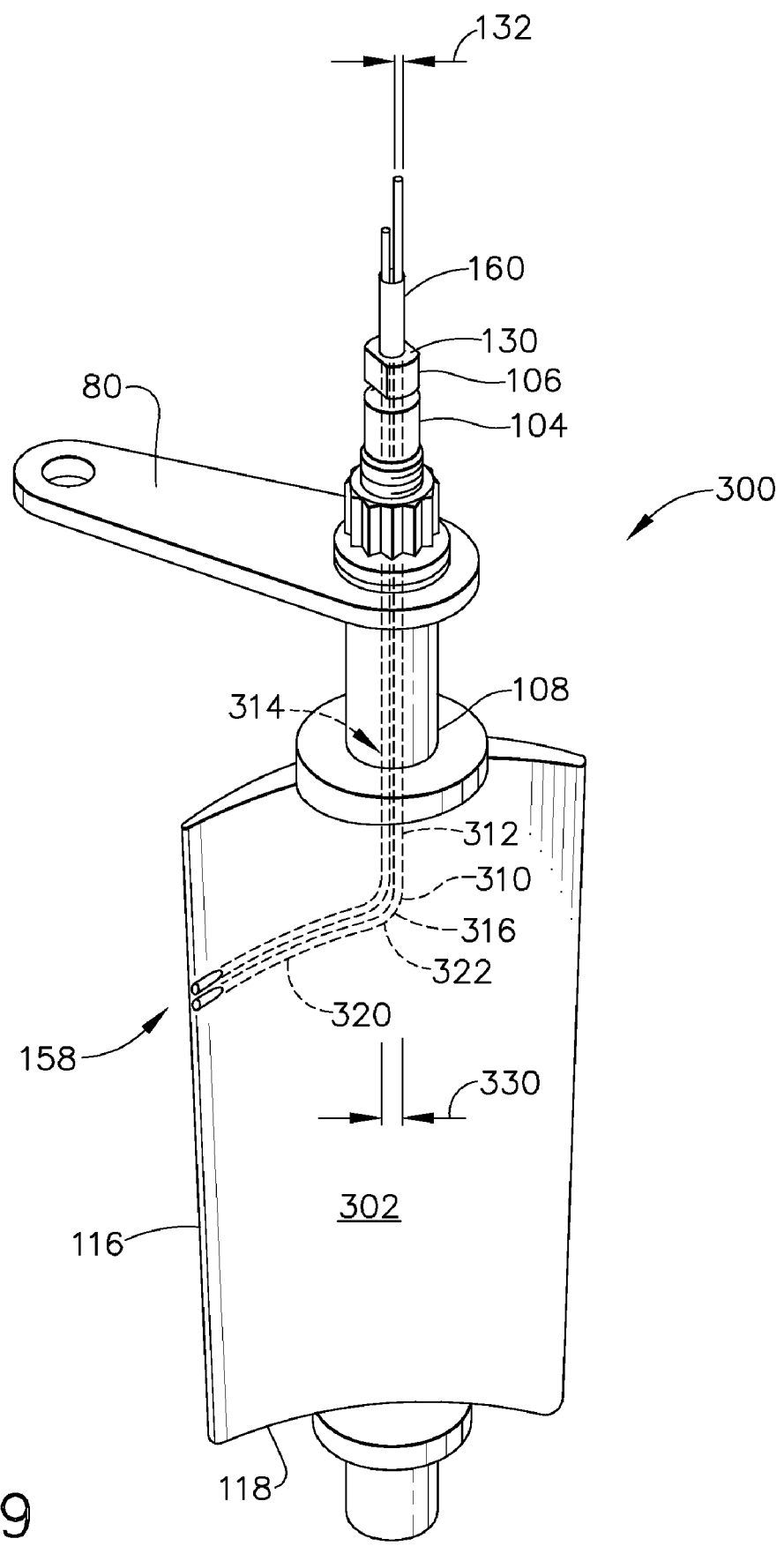
FIG. 9 is a perspective view of an another exemplary stator vane including a light probe that may be utilized with the gas turbine engine shown in FIG. 1.

FIG. 9 is a perspective view of an exemplary stator vane 300 including light probe 160 that may be utilized with the gas turbine engine shown in FIG. 1. Stator vane 300 includes an airfoil 302 and an integral vane stem 104 that is used for mounting stator vane 300 within gas turbine engine 10. More specifically, vane stem 104 includes a first or radially outer end 106 that in the exemplary embodiment is coupled to lever arm 80, and a second or radially inner root 108 that is coupled to airfoil 302. As discussed above, in the exemplary embodiment, airfoil 302 is formed unitarily with vane stem 104 to form a unitary stator vane 300.

As shown in FIG. 9, stator vane 300 includes an opening 130 that extends from vane stem radially outer end 106, through vane stem 104, to vane stem radially inner root 108. In the exemplary embodiment, opening 130 has a diameter 132 that is sized to receive light probe 160. In this exemplary embodiment, stator vane 300 does not include a groove or slot 140 that is machined into a surface of airfoil 302. Rather stator vane airfoil 302 includes an airfoil opening 310 that extends at least partially through airfoil 302 such that at least a portion of the airfoil opening 310 is substantially concentrically aligned with the vane stem opening 130.

More specifically, and as shown in FIG. 9, airfoil opening 310 includes a first airfoil opening portion 312 having a first end 314 that is substantially concentrically aligned with opening 130 and a second end 316. First portion 312 extends at least partially radially inwardly toward radially inner root 108 of vane stem 104. Airfoil opening 310 also includes a second airfoil opening portion 320 having a first end 322 that is substantially perpendicular to first end 314. In the exemplary embodiment, second airfoil opening portion 320 extends downstream from first airfoil opening portion second end 316 towards airfoil trailing edge 116. As such, and as shown in FIG. 9, airfoil opening 310 has a substantially L-shaped profile and extends continuously from vane stem 104 to airfoil trailing edge 116. Airfoil opening 310 has a diameter 330 that is sized to receive light probe 160 therethrough.

Accordingly, the combination of vane stem opening 130 and airfoil opening 310 form a continuous probe inspection port 158 that extends from the vane stem radially outer end 106, through vane stem 104, radially inwardly towards airfoil root 118, and downstream towards airfoil trailing edge 116.

A method for manufacturing a stator vane includes coupling an airfoil to a vane stem, the airfoil including a first sidewall and a second sidewall, the first and second sidewalls joined at a leading edge and at an axially-spaced trailing edge, forming an opening through the vane stem, inserting a light probe through the vane stem opening, and securing the light probe to the airfoil.

Described herein is a stator vane that includes an integral light probe. The stator vane may be utilized with a wide variety of gas turbine engine applications. Moreover the stator vane may be modified to use with other turbines such as steam turbines for example. The exemplary stator vanes described herein are configured to be utilized within a gas turbine engine compressor. The stator vanes may be fixed within the compressor or may be coupled to a variable stator vane assembly such that the stator vanes are movable within the compressor. Moreover, although the invention is described with respect to a single stator vane including a light probe, it should be realized that a plurality of stator vanes each including an integral light probe may be installed within a single gas turbine engine. For example, a stator vane that includes an integral light probe may be installed in a plurality of compressor stages to facilitate measuring the frequency of the rotor blades in each compressor stage.

More specifically, the stator vane is positioned axially forward of a respective row of rotor blades. The light probe is then coupled to the stator vane such that the light probe is mounted axially or along the flow stream and turned radially outwardly such that one end of the light probe extends radially outwardly through the stator vane stem such that the light probe extends from the compressor casing to facilitate coupling the light probe to external equipment. Moreover, the light probe faces in an approximately downstream axial direction along the airfoil with the capability of viewing the rotor blade leading edge. During operation, the light probe is configured to measure differences in blade frequency indicating that the blade has experienced damage and a crack is growing.

As such, the stator vane described herein including the light source is positioned axially forward from the rotor blades and as such any dirt and/or debris that is centrifuged radially outward by the rotor blades with not be deposited on the light probe. As a result, the dirt or debris does accumulate on the light probe thereby increasing the effectiveness of the light probe to accurately measure the frequency of the rotor blades.

While the invention has been described in terms of various specific embodiments, those skilled in the art will recognize that the invention can be practiced with modification within the spirit and scope of the claims.

What is claimed is:

1. A method for manufacturing a stator vane, said method comprising:
    coupling an airfoil to a vane stem, the airfoil including a first sidewall and a second sidewall, the first and second sidewalls joined at a leading edge and at an axially-spaced trailing edge;
    forming an opening through the vane stem;
    inserting a light probe through the vane stem opening;
    inserting the light probe through the vane steam opening such that the light probe is positioned adjacent either the first or second airfoil sidewall; and
    depositing a material onto a surface of at least one of the first and second sidewalls to secure the light probe to the airfoil.

2. The method in accordance with claim 1, wherein forming an opening through the vane stem further comprises forming the opening such that the opening is substantially concentrically aligned within the vane stem.

3. The method in accordance with claim 1, wherein securing the light probe to the airfoil further comprises:
    forming a groove in at least one of the first and second sidewalls such that at least a portion of the groove is substantially concentrically aligned with the vane stem opening; and
    securing the light probe within the groove.

4. The method in accordance with claim 3, further comprising forming a groove having a width and a depth that are each greater than a diameter of the light probe.

5. The method in accordance with claim 1, wherein securing the light probe to the airfoil further comprises:
    forming an opening extending through the airfoil such that at least a portion of the airfoil opening is substantially concentrically aligned with the vane stem opening; and
    securing the light probe within the airfoil opening.

6. A stator vane, comprising:
    a vane stem;
    an airfoil coupled to said vane stem, said airfoil comprising a first sidewall and a second sidewall, said first and second sidewalls joined at a leading edge and at an axially-spaced trailing edge; and
    a probe inspection port comprising:
        an opening extending through said vane stem, said opening sized to receive a light probe therein; and
        a groove formed on an exterior surface of at least one of said first and second sidewalls, at least a portion of said groove is substantially concentrically aligned with said vane stem opening.

7. The stator vane in accordance with claim 6, wherein said probe inspection port is formed substantially concentrically within said vane stem and extends radially inwardly towards a radially inner end of said airfoil and axially downstream towards said airfoil trailing edge.

8. The stator vane in accordance with claim 6, wherein said probe inspection port further comprises a groove formed in at least one of said first and second sidewalls, at least a portion of said groove is substantially concentrically aligned with said vane stem opening.

9. The stator vane in accordance with claim 8, wherein said groove has a width and a depth that are each greater than a diameter of the light probe.

10. The stator vane in accordance with claim 6, wherein said probe inspection port further comprises an opening extending through said airfoil, at least a portion of said airfoil substantially concentrically aligned with said vane stem opening.

11. A gas turbine engine assembly, comprising:
    a compressor;
    a combustor; and
    a turbine coupled to said compressor, at least one of said compressor and said turbine comprising:
        a rotor assembly including a plurality of rotor blades; and
        a stator vane assembly including a plurality of stator vanes, at least one of said stator vanes comprising
        a vane stem;
        an airfoil coupled to said vane stem, said airfoil comprising a first sidewall and a second sidewall, said first and second sidewalls joined at a leading edge and at an axially-spaced trailing edge; and
        a probe inspection port comprising:
            an opening extending through said vane stem, said opening sized to receive a light probe therein; and
            a groove formed in at least one of said first and second sidewalls, at least a portion of said groove is substantially concentrically aligned with said vane stem opening.

12. The gas turbine engine assembly in accordance with claim 11, wherein said probe inspection port is formed substantially concentrically within said vane stem and extends radially inwardly towards a radially inner end of said airfoil and axially downstream towards said airfoil trailing edge.

13. The gas turbine engine assembly in accordance with claim 12, further comprising a light probe having a first end and a second end, said light probe positioned within said probe inspection port such that said light probe first end extends radially outwardly from said gas turbine vane stem and such that said light probe second end is positioned proximate to said airfoil trailing edge.

14. The gas turbine engine assembly in accordance with claim 13, further comprising a bonding material that is utilized to maintain said light probe within said probe inspection port.

15. The gas turbine engine assembly in accordance with claim 11, wherein said groove has a width and a depth that are each greater than a diameter of the light probe.

16. The gas turbine engine assembly in accordance with claim 11, wherein said probe inspection port further comprises an opening extending through said airfoil, at least a portion of said airfoil opening substantially concentrically aligned with said vane stem opening.

17. The gas turbine engine assembly in accordance with claim 11, wherein said probe inspection port further comprises a groove formed on an exterior surface of at least one of said first and second sidewalls, at least a portion of said groove is substantially concentrically aligned with said vane stem opening.

* * * * *